Feb. 13, 1940. M. B. PITZER Re. 21,356

METHOD OF AND MEANS FOR TREATING WELLS

Original Filed March 10, 1936

Inventor

M. B. Pitzer

By C. A. Snow & Co.

Attorneys.

UNITED STATES PATENT OFFICE 21,356

METHOD OF AND MEANS FOR TREATING WELLS

Mose B. Pitzer, Menahans, Tex.

Original No. 2,080,875, dated May 18, 1937, Serial No. 68,098, March 10, 1936. Application for reissue February 18, 1938, Serial No. 191,346

15 Claims. (Cl. 166—21)

This invention relates to a method of treating the various formations in oil and gas wells and the like to increase the rate of flow therefrom, various materials being used to produce a porous formation at the base of the well.

A further object is to utilize a novel method of applying various materials to the oil and gas bearing formations so as to produce a porous cavity formation, secure the maximum production from the various oil and gas formations and the like, and to use materials which will assure the proper and desired results.

Another object is to apply the treatment materials to the base of the well under pressure, and to employ materials that will not reduce the gas pressure or corrode the drill pipe, tubing, etc.

A further object is to utilize an arrangement of chemicals and a high explosive in the treatment of the oil and gas producing formations and the like.

Those skilled in the art will understand that a great percentage of oil and gas bearing structures have failed to respond successfully to chemical treatment alone, or to the mere shooting of the well.

The present invention is to overcome the failure of either of the above mentioned treatments, and to assure a successful treatment by the simultaneous use of chemicals and a high explosive, thereby to increase the flow from any virgin, producing formation, and obtain maximum production.

Another object of the present invention is to make it possible to use a highly concentrated chemical such as acids, fluorides and the like without danger of damage to the drill pipe or tubing, or danger of cementation or clogging of the pores of the various formations.

Another object of the present invention is to fracture the formation and at the same time release the chemical compounds such as acids, alkalies, fluorides so as to assure a more rapid and successful treatment with the chemicals used in this method.

Another object is to eliminate the excessive chemical treatment of oil and gas wells, and also the excessive shooting of the same in order to secure the maximum flow. Many formations have been bridged or clogged by excessive shooting, and no doubt excessive chemical treatment of some formations have sealed the pores of the formation and resulting in a decrease instead of an increase in the rate of flow.

In carrying out the method herein described there is provided a shell or a series of shells whereby treatment chemicals and a high explosive are lowered into the well and when brought to the proper formation or formations, are exploded to shatter the formations, release the chemicals and increase the porosity of the well walls.

In the accompanying drawing there has been shown, in a general way, the means utilized for treating the well in accordance with the present invention.

In said drawing—

Figure 1:
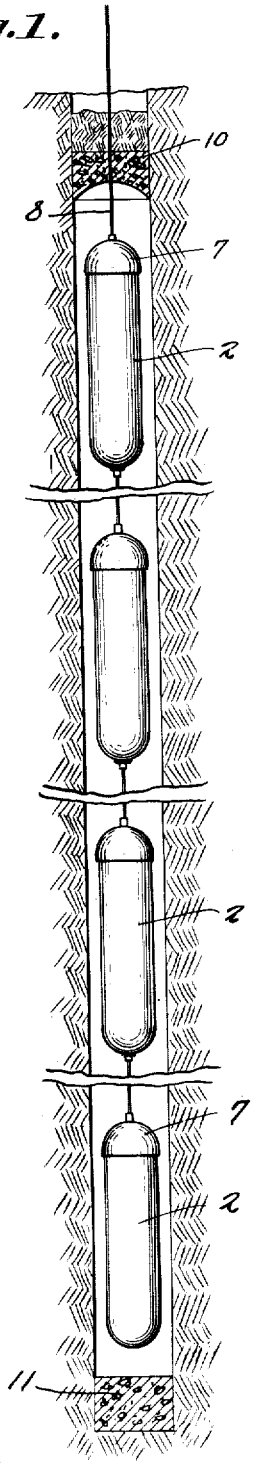
Figure 1 is a section through a well showing a string of shells suspended therein at different elevations preparatory to being exploded.
Figure 2:
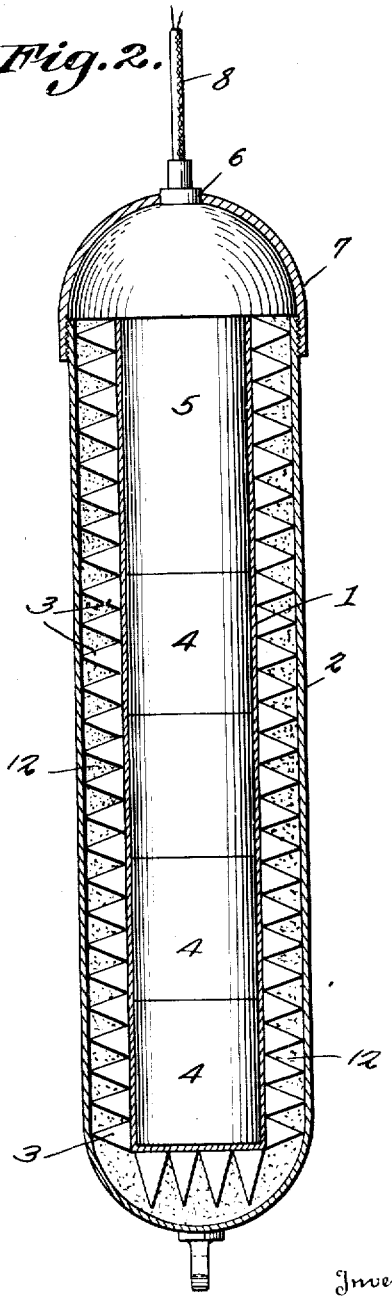
Figure 2 is an enlarged section through a single shell.

Referring to the figures by characters of reference 1 designates a shell of brittle material having a jacket 2, likewise of a brittle material, and the space between the shell and jacket can be partly or entirely filled with slugs 3 formed on the surface of the shell and/or jacket or separate therefrom.

Containers 4 each filled with a treatment chemical and said chemicals being in proportions each to the others, are seated in shell 1, and another container or bomb 5 holding nitroglycerin or other high explosive, is located in the upper end of shell 1. A cap 6, adapted to be exploded electrically, is carried by the head 7 of the shell and has wires 8 leading thereto from a suitable source of current where a retarded switch or the like, not shown, can be used for controlling the firing of the cap.

The treatment chemicals in the container can consist of acids, alkalies, fluorides, and the like. The shell, suitably charged, is inserted into the well and the bomb 5 exploded in the upper section of the shell. This will fracture the walls of the formation and at the same time release the chemicals in the lower portion of the shell so that they act on the formation, produce maximum porous formation, and assure the operator the maximum increase in the rate of flow of oil and gas from such formation.

When the shell is exploded the fragments, including the slugs 3, will be driven back into the well formation, thereby increasing its porosity so as to allow the released chemicals to act more quickly and thoroughly to remove substances interfering with the seepage of oil or gas into the well.

In some oil fields there may be two or more commercial pay structures at various depths. In that event the shells can be so arranged in a string, as in Figure 1, to be discharged in the various strata simultaneously. However if a well has several pay strata it is usually desired to treat the lower one first. This will enable the operator to clean the well from the bottom as each treatment or shell application is effected.

If oil and gas formations require a large volume of chemicals or the like to produce the desired porous formation in the treatment of the well, these may be applied before inserting the shell into the base of the well. This will increase the rate of flow and produce a greater porous formation at the base of the well than if chemically treated only or if treated by a high explosive alone. However in most oil and gas formations a shell such as herein described will produce better results than have been heretofore obtainable by other methods.

After the loaded shell or shells have been inserted into the well better results will be had by using an umbrella-bridge 10 above them, this being tamped with a few feet of crushed rock, gravel and/or sand, as shown in Figure 1. As a result the force of the high explosive will be downwardly and outwardly and all of the treatment material will be retained at the base of the well.

As before stated any chemical compound can be used, depending upon the nature of the formation. Among those employed have been, nitric acid, sulphuric acid, sodium nitrates, chlorines, brines, chlorides, bromides, hydrogens, sulfides, muriatic acid, hydrochloric and hydrofluoric acid, arsenic acid, arsenic trioxide, organic nitrogen, organic sulphur compounds, such as mercaptans, various gaseous compounds, and a water solution of hydrobromic acid. Various high explosives may be used in the upper portions of the shells, such as nitroglycerin, gunpowder, and the like. The containers may be made of tin, brittle steel, Bakelite, or various other materials, and can be lined with rubber, lead, ceresin-wax, or paraffin so as to prevent action of the chemical upon the shell or containers while in transit or being handled. The high explosive preferably is added to the shell at the well, although it can be placed in the shell at the treating plant.

As before stated, the kind of chemicals used depends entirely upon the character of the formation to be treated. It is to be understood also that the volume of chemical compound should exceed the explosive materials at least seventy-five percent to produce the desired results.

The chemical compounds used in the shell are highly concentrated, and have several times the strength of the commercial chemicals heretofore used. If the base of the well is dry a certain amount of water or other liquids may be forced or pumped into the base of the well so that when the chemicals are released from the shell after the explosion of the nitroglycerin, they can become mixed with the water or liquid at the base of the well and increase the volume of the active chemical compound.

The shells may be made in various sizes and capacities. They may be discharged in various ways. For example it can be done by dropping thereon a "jack" comprising a cap fuse and a stick of dynamite. This will explode the cap 6 and discharge the nitroglycerin. The explosion of the nitroglycerin will in turn release the chemical compounds in the lower section of the shell, and will completely destroy the shell. The result of this action is complete fracture of the formation so as to facilitate the reaction of the chemicals upon the material of formation. This will produce maximum porosity and increase the rate of flow of oil and gas from the various formations at the base of the well.

If preferred, and as heretofore stated, the bomb can be exploded electrically by any suitable means. Although any suitable chemical compound such as alkali, fluorides and the like may be used, it is preferred to employ in the shell muriatic, hydrochloric, hydrofluoric, and/or nitric acid, although sulphuric acid may be used in some formations where there is no danger of calcium sulphate in such formations. The chemicals used are highly concentrated and a small amount of water or other fluid may be retained in the hole so that when the chemicals are released from the shells by the explosion they will be mixed with the fluid and form a large volume of chemical solution in the base of the well or formation.

The following is an example where a chemical solution and a gas generating material is used in the shell, and applied to the base of the well containing a small volume of water. Commercial concentrated hydrochloric acid and calcium carbide are used at the rate of approximately sixty pounds each for each ten feet of sand or formation depth. A shell containing the above chemicals should also be loaded with about four or five pounds of sodium peroxide, or this latter may be inserted into the well after the shell or shells have been placed in the base of the well. The reaction solution should be allowed to remain in the well about three hours and then bailed out. This same treatment may be repeated if necessary. Pumping may be started immediately.

The result of the treatment of oil and gas wells and the like or formations thereof with a shell as herein described, is to increase the rate of flow from the various formations from three to eight times more than the original production.

In case the shell is not completely destroyed by the explosion of the nitroglycerine in the upper section thereof, it can be drilled and bailed out of the hole. It is to be understood however, that it is desired to use a brittle material for the shells so that they will be completely destroyed by the explosion and avoid the necessity of drilling and bailing them from the hole.

In some formations in the various oil fields where the water line is located directly below the oil and gas formation, a concrete plug 11 of several feet in depth may be applied to the bottom of the hole before the chemicals, or shells, are inserted into the well. This is to prevent the chemicals from reacting on the bottom surface of the well and prevent the hazard of the chemicals, in their reaction, encountering the water level at the base of the well, The open space in the shells around the slugs may be packed with sawdust 12 or some explosive material, to hold the slugs in place until the shell is discharged at the base of the well. A variety of materials may be used for the slugs if so desired.

The cost of the chemicals used is nominal and they can be handled with comparative safety. The resulting products of the reaction on limestone, sand, etc., are water and chlorides of calcium and magnesium, (all of which are readily soluble in water) and/or carbon gas ($CO_2$). These substances are harmless, inert fluids which are readily removed from the well by ordinary production processes after the treatment is completed following the discharge of the shell at the base of the well.

Sulphuric acid and an inhibitor would not be a successful combination if used alone in the shell. The use of sulphuric acid would result in the production of insoluble calcium sulphate. This would be precipitated within the pores of the formation where it would most likely cause the clogging of the producing formation and would be troublesome to handle. In some cases the sulphate content even causes a hazard in the connection. With the use of 14 percent hydrochloric acid containing more than three-tenths percent sulphate ($SO_4$), precipitation of insoluble sulphates in the reaction of hydrochloric acid and lime or a limestone formation will result. For this reason it is preferred to restrict the sulphate content of the various chemicals and compounds used to three-tenths percent or less.

Hydrofluoric acid, mixed with various other chemicals and compounds and the like may be used in the lower section of the shell, for the treatment of a siliceous sandstone, lime, limestone or a sandy-lime formation. The products resulting from its reaction are insoluble in water and hydrochloric acid. Moreover an objection to such use is the public health hazard that might result from the contamination of water supplies with fluorides.

The commercial hydrochloric acid used in the treatment of oil and gas wells is designated as 18° Bé., or 20° Bé. These are approximately 28 and 31.5 percent hydrochloric acid. The acid or chemicals may be cut with water, at the treating plant, to the desired percentage of concentration, mixed with other chemicals and compounds, if so desired, and put then into the lower section of the shell. For practical use concentration should not be lower than ten percent and not higher than twenty percent. This is where the chemical is to be used in a bulk form; but the acid can be more highly concentrated when used in the shell as mentioned.

The amount of lime, limestone, sandstone and the like (or, rather, of carbonates) which is dissolved by the chemicals is in proportion to the weight of the respective substances. A given weight of hydrogen chloride will be just as effective in disintegrating lime, limestone, or dolomite, regardless of the proportion of water in which it may be contained.

As before stated when a shell like that herein disclosed is used in the treatment of oil and gas wells or formations thereof, the flow in the majority of cases will more than double the pretreatment average rate. Actual physical enlargement of the hole at the base of the well is accomplished where the shell is used to remove so-called gyp scale from the walls of the hole. The scale is more or less a continuous coating. Samples have revealed thickness in some cases exceeding one and one-half inches. It is built up by precipitation of carbonates from infiltrating waters. Tests of various samples have shown that it is solely on the face of the sand and does not penetrate into the formation.

Removal of this scale with an explosive shell causes increased production because of the removal of this physical barrier to the flow of oil and gas, and not because of any reduction of resistance within the producing formation itself.

In some formations the pores need only slight enlargement to cause effective increase in production.

The number of shells to be used in this method vary greatly, taking into consideration the porous nature and solubility of the formation to be treated. In some formations two or three shells will no doubt produce the desired results and in other formations eight or ten shells may be necessary.

Although I have described my invention for use in the treatment of oil and gas wells, it may be applied to mine wells and the like, it being understood that changes may be made within the scope of the appended claims.

I claim:

1. The herein described method of increasing the flow of a well which includes the steps of inserting a treatment fluid, and then breaking up the wall of the well adjacent to the fluid by firing solid substances thereinto.

2. The herein described method of increasing the flow of a well which includes the steps of lowering a treatment fluid into the well and then exploding a bomb in the well to scatter the fragments of the bomb into the wall of the well and open said wall for admission of the treatment fluid.

3. The method of increasing the flow of a well which includes the steps of lowering a treatment fluid into the well, and then shattering a brittle shell with an explosive to break up a portion of the wall of the well to admit the treatment fluid.

4. The method of increasing the flow of a well which includes the step of lowering into the well a shell containing an explosive and a treating chemical, and thereafter exploding the shell to scatter its fragments into the adjacent portion of the wall of the well and to release the chemical for attack upon the crevices opened by said fragments.

5. The method of increasing the flow of a well which includes the step of lowering separated chemicals into the well, and thereafter exploding a shell in the well to release and mix the chemicals, and to shatter the adjacent portion of the wall of the well for attack by the mixed chemicals.

6. A bomb for treating wells including a shell of brittle material, an explosive at the upper end thereof, and a treatment material in the lower portion.

7. A bomb for treating a well to increase its flow, including a brittle shell, an explosive in the upper end thereof, separate treatment chemicals contained in the lower portion thereof adapted when mixed to react and produce an active fluid for attacking and dissolving foreign substances closing the pores of a well formation, and means for exploding the bomb to scatter its fragments into the wall of the well and release and mix the chemicals.

8. The method of increasing the rate of flow from oil and gas wells and the like which includes the steps of lowering into the well shells containing a strong mineral acid, an alkali fluoride and an explosive, and, thereafter exploding the shells to scatter their fragments into the walls of the well to release and mix the chemical for attack upon the crevices opened by the explosion.

9. The method of effecting a flow from a dead well oil and gas formation which includes the steps of inserting or forcing into the well a shell or shells containing a high explosive, and one or more chemicals such as hydrofluoric, hydrochloric, nitric or sulphuric acid, and an alkali fluoride, thereafter exploding the shells to shatter the walls of the formation, release the chemicals to react upon the shattered formation and apply pressure to force the chemicals back into the pores of the formation to dissolve foreign matters in the pores thereof.

10. The method of increasing the flow from oil and gas or mine wells which includes the steps of inserting into the well shells containing a high explosive and one or more strong chemicals or compounds, and thereafter exploding the shells to shatter the formation and release the chemicals to react upon the gyp-scales and formation to dissolve at least a portion of same.

11. The method of increasing the rate of flow from oil and gas wells which includes the steps of inserting into the well shells containing a high explosive and a strong chemical or compound to shatter gyp-scales along the walls of the well and release the chemicals to dissolve at least a portion of the gyp-scale formation.

12. A bomb for treating wells including a shell of brittle material, an explosive within the shell, and a multiplicity of slugs surrounding the shell for penetrating the walls of the well when the explosive is detonated, and a treatment material within the shell.

13. A bomb for treating wells including a shell of brittle material, an explosive within the shell, a multiplicity of slugs surrounding the shell, and means for exploding the bomb to drive its fragments into the wall of the well.

14. The herein described method of increasing the flow of a well which includes the steps of inserting a slug-studded bomb into the well and exploding the bomb to cause the slugs to penetrate the wall of the well.

15. The herein described method of increasing the flow of a well which includes the steps of inserting into the well a series of shells containing a high explosive and a multiplicity of slugs having their pointed ends directed toward the wall of the well, and detonating the explosive to drive the slugs into the wall formation.

MOSE B. PITZER.